(12) United States Patent
Wang et al.

(10) Patent No.: US 12,362,345 B2
(45) Date of Patent: Jul. 15, 2025

(54) BATTERY CELL, BATTERY, AND ELECTRIC DEVICE

(71) Applicant: Ningde Amperex Technology Limited, Fujian (CN)

(72) Inventors: Cun Wang, Ningde (CN); Jiao Tian, Ningde (CN); Yujiang Xu, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 637 days.

(21) Appl. No.: 17/705,876

(22) Filed: Mar. 28, 2022

(65) Prior Publication Data

US 2022/0320477 A1 Oct. 6, 2022

(30) Foreign Application Priority Data

Mar. 31, 2021 (CN) .......................... 202110350163.2

(51) Int. Cl.
*H01M 4/02* (2006.01)
*H01M 50/107* (2021.01)
*H01M 50/179* (2021.01)

(52) U.S. Cl.
CPC ........... *H01M 4/02* (2013.01); *H01M 50/107* (2021.01); *H01M 50/179* (2021.01); *H01M 2004/025* (2013.01)

(58) Field of Classification Search
CPC ................. H01M 4/02; H01M 50/179; H01M 2004/025; H01M 50/105; H01M 10/0431; Y02E 60/10
See application file for complete search history.

(56) References Cited

U.S. PATENT DOCUMENTS

| | | | |
|---|---|---|---|
| 2007/0099076 A1* | 5/2007 | Okuda | H01M 10/0431 429/162 |
| 2009/0165290 A1 | 7/2009 | Yu et al. | |
| 2011/0244315 A1 | 10/2011 | Yoon | |
| 2013/0316206 A1 | 11/2013 | Jeong et al. | |
| 2016/0315296 A1* | 10/2016 | Kimura | H01M 50/124 |
| 2018/0019447 A1 | 1/2018 | Adonakis | |
| 2019/0181505 A1* | 6/2019 | Otsuka | H01M 50/136 |

FOREIGN PATENT DOCUMENTS

| | | |
|---|---|---|
| CN | 2938434 Y | 8/2007 |
| CN | 101093899 A | 12/2007 |
| CN | 204792927 U | 11/2015 |
| CN | 105355982 A | 2/2016 |
| CN | 208352347 U | 1/2019 |
| CN | 110767935 A | 2/2020 |

OTHER PUBLICATIONS

Supplementary European Search Report mailed Sep. 15, 2022, in European Application No. 22164536.9, 15 pages.
Office Action mailed Mar. 30, 2023, in Chinese Application No. 202110350163.2, 10 pages including English Translation.

* cited by examiner

*Primary Examiner* — Nicholas A Smith
*Assistant Examiner* — Seamus Patrick McNulty
(74) *Attorney, Agent, or Firm* — XSENSUS LLP

(57) ABSTRACT

A battery cell includes an electrode assembly. A shape of a radial cross section of the electrode assembly is an ellipse. A length of a major axis noted as L1 and a length of a minor axis noted as L2 of the electrode assembly satisfy a relational expression: 0.3 mm≤L1−L2≤0.5 mm.

17 Claims, 2 Drawing Sheets

BATTERY CELL, BATTERY, AND ELECTRIC DEVICE

CROSS-REFERENCE TO RELATED APPLICATIONS

The present application claims the benefit of priority from the Chinese Patent Application No. 202110350163.2, filed on Mar. 31, 2021, the content of which is incorporated herein by reference in its entirety.

TECHNICAL FIELD

This application relates to the technical field of batteries, and in particular, to a battery cell, a battery, and an electric device.

BACKGROUND

The structure of a conventional jelly-roll cell is cylindrical, in which a major axis diameter and a minor axis diameter of an electrode assembly are the same. In a case of side sealing, the edge of a finished battery cell needs to be folded. After the edge folding, a thickness equivalent to two layers of aluminum plastic film is added outside the aluminum plastic film. In addition, there is a gap between the folded edge and the electrode assembly. Consequently, the edge folding position increases the diameter of the electrode assembly, reduces space efficiency of the diameter of the finished battery cell, and thereby affects the energy density of the battery cell.

Therefore, it is necessary to provide a battery cell to increase the space efficiency of the battery cell and increase the energy density of the battery cell.

SUMMARY

An objective of the embodiments of this application is to provide a battery cell, a battery, and an electric device to increase space efficiency of a diameter of the battery cell and increase the energy density of the battery cell.

To achieve the foregoing objective, an embodiment of this application provides a battery cell. The battery cell includes an electrode assembly. A shape of a radial cross section of the electrode assembly is an ellipse. A length of a major axis noted as L1 and a length of a minor axis noted as L2 of the electrode assembly satisfy a relational expression: $0.3 \text{ mm} \leq L1-L2 \leq 0.5 \text{ mm}$.

In some embodiments, the battery cell further includes a packaging bag. The packaging bag includes a main body and a sealing edge portion. The main body is configured to accommodate the electrode assembly. The sealing edge portion includes a first sealing edge and two second sealing edges. Along an axial direction of the electrode assembly, the first sealing edge is connected between the two second sealing edges.

A first end of the first sealing edge is connected to the main body. A second end of the first sealing edge is bent and fits snugly on an outer surface of the main body. A gap region is formed between a first surface of the first sealing edge and the outer surface of the main body.

The first surface of the first sealing edge is a surface of the first sealing edge on a side close to the main body.

In some embodiments, along a radial direction of the electrode assembly, H1 is a thickness of the first sealing edge, H2 is a width of the gap region, and L1, L2, H1, and H2 satisfy a relational expression: $L2+H1+H2 \leq L1$, so as to ensure that a radial maximum size of the battery cell lies in the major axis. The width of the gap region means a distance from a point on the first surface of the first sealing edge to the outer surface of the main body, and is equal to a distance from such point to an intersection of the major axis and the minor axis of the electrode assembly minus a distance from a point on the outer surface of the main body in the same direction to the intersection of the major axis and the minor axis of the electrode assembly.

In some embodiments, L3 is a maximum distance from a second surface that is of the first sealing edge and that is away from the electrode assembly to a central axis of the electrode assembly, and $L3 \leq L1/2$, so as to ensure that the radial maximum size of the battery cell lies in the major axis.

The second surface of the first sealing edge is a surface of the first sealing edge on a side away from the main body.

In some embodiments, along a radial direction of the electrode assembly, H2 is a width of the gap region, and $0.2 \text{ mm} \leq H2 \leq 0.35 \text{ mm}$.

In some embodiments, along a bending direction of the first sealing edge, the second end of the first sealing edge does not exceed an end point of the major axis on a side close to the first sealing edge.

In some embodiments, along the bending direction of the first sealing edge, L4 is a distance from the end point of the major axis on the side close to the first sealing edge to the second end of the first sealing edge, and $L4 > 0.5 \text{ mm}$.

In some embodiments, the battery cell includes a first tab and a second tab. The first tab is connected to the electrode assembly and extends out of the packaging bag from one of the second sealing edges. The second tab is connected to the electrode assembly and extends out of the packaging bag from the other second sealing edge.

Another embodiment of this application further provides a battery, including any one of the foregoing battery cells.

Another embodiment of this application further provides an electric device, including any one of the foregoing batteries and a load. The battery is configured to supply power to the load.

Beneficial effects of the embodiments of this application are: by designing an elliptical shape of the radial cross section of the electrode assembly and limiting the dimensions of the major axis and the minor axis, in contrast to a conventional battery cell with a radial cross section that is circular, the solution disclosed herein can increase space efficiency of the battery cell and increase the energy density of the battery cell.

BRIEF DESCRIPTION OF DRAWINGS

One or more embodiments are described exemplarily with reference to accompanying drawings corresponding to the embodiments. The exemplary description does not constitute any limitation on the embodiments. Components marked with the same reference numeral in the drawings represent similar components. Unless otherwise specified, the drawings do not constitute any scale limitation.

DETAILED DESCRIPTION

Figure 1:
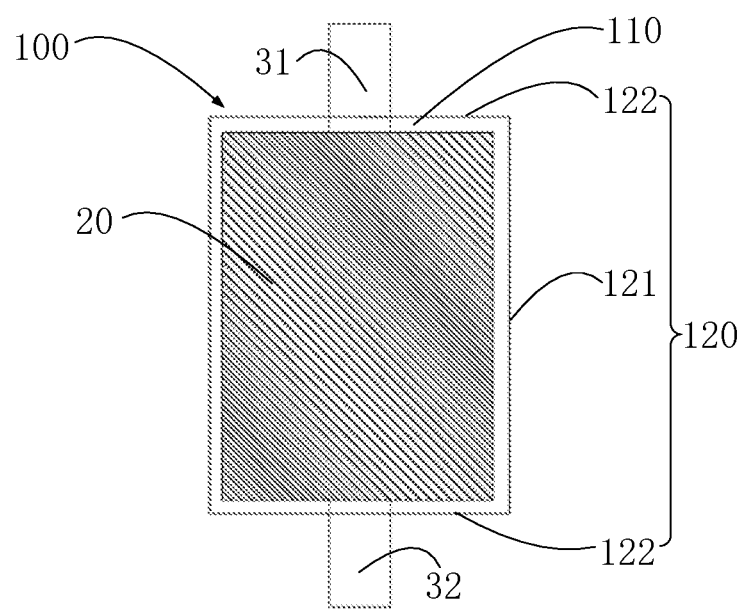
FIG. 1 is a schematic plan view of a battery cell according to an embodiment of this application.

For ease of understanding this application, the following describes this application in more detail with reference to drawings and specific embodiments. It needs to be noted that an element referred to herein as "fixed to" or "mounted to"

another element may directly exist on the other element, or may be fixed to the other element through one or more intermediate elements. An element referred to herein as "connected to" another element may be connected to the other element directly or through one or more intermediate elements. A direction or a positional relationship indicated by the terms such as "upper", "lower", "in", "out", "vertical", and "horizontal" used herein is a direction or positional relationship based on the illustration in the drawings, and is merely intended for ease or brevity of describing this application, but does not indicate or imply that the indicated device or component must be located in the specified direction or constructed or operated in the specified direction. Therefore, such terms are not to be understood as a limitation on this application. In addition, the terms "first" and "second" are merely used for descriptive purposes, but shall not be construed as indicating or implying relative importance.

Unless otherwise defined, all technical and scientific terms used herein have the same meanings as what is generally understood by a person skilled in the technical field of this application. The terms used in the specification of this application are merely intended to describe specific embodiments but not to limit this application. The term "and/or" used herein is intended to include any and all combinations of one or more related items preceding and following the term.

In addition, the technical features described below and mentioned in different embodiments of this application may be combined with each other so long as they do not conflict with each other.

Referring to FIG. 1, FIG. 1 shows a battery cell 100 according to an embodiment of this application. The battery cell 100 is a jelly-roll cell and includes a packaging bag 10, an electrode assembly 20, and a tab 30. The electrode assembly 20 is accommodated in the packaging bag 10. The tab 30 is connected to the electrode assembly 20 and protrudes from the packaging bag 10. A shape of a radial cross section of the electrode assembly 20 is an ellipse. A length of a major axis noted as L1 and a length of a minor axis noted as L2 of the electrode assembly 20 satisfy a relational expression: $0.3 \text{ mm} \leq L1-L2 \leq 0.5 \text{ mm}$.

Figure 2:
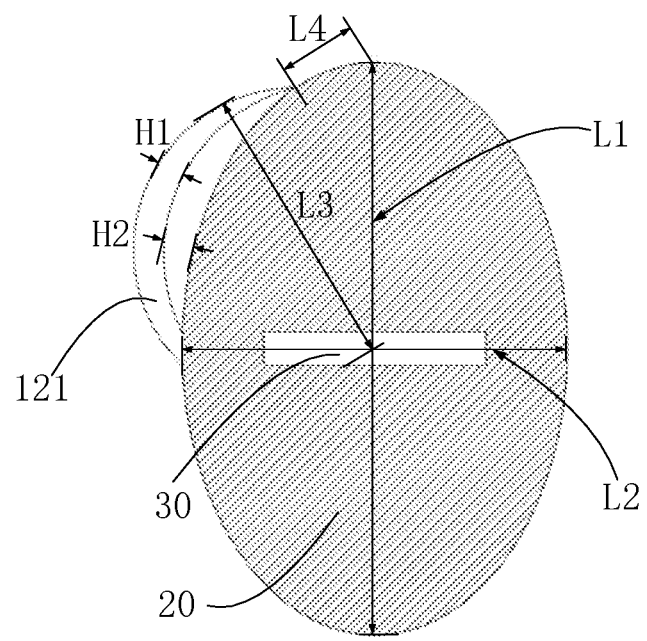
FIG. 2 is a top view of the battery cell shown in FIG. 1.

Referring to FIG. 2, the packaging bag 10 includes a main body 110 and sealing edge portion 120 connected to the main body 110. The electrode assembly 20 is accommodated in the main body 110. The sealing edge portion 120 includes a first sealing edge 121 and two second sealing edges 122. Along an axial direction of the electrode assembly 20, the first sealing edge 121 is connected between the two second sealing edges 122. A first end of the first sealing edge 121 is connected to the main body 110. A second end of the first sealing edge 121 is bent and fits snugly on an outer surface of the main body 110. A gap region is formed between a first surface of the first sealing edge 121 and the outer surface of the main body 110.

It needs to be noted that the first surface of the first sealing edge 121 is a surface of the first sealing edge 121 on a side close to the main body 110.

Using a packaging bag 10 of the same size, the battery according to this embodiment of this application is more space-efficient than a conventional battery cell with a circular radial cross section.

In some embodiments, the packaging bag 10 may be an aluminum plastic film.

It needs to be noted that the first sealing edge and the second sealing edges may be sealed by hot melting.

Still referring to FIG. 2, along the radial direction of the electrode assembly 20, H1 is a thickness of the first sealing edge, H2 is a width of the gap region, and the thickness H1 of the first sealing edge and the width H2 of the gap region satisfy a relational expression: $L2+H1+H2 \leq L1$. In this way, the radial maximum size of the battery cell 100 is L1, thereby improving the space efficiency of the battery cell.

It needs to be noted that the width of the gap region means a distance from a point on the first surface of the first sealing edge 121 to the outer surface of the main body 110, and is equal to a distance from such point to an intersection of the major axis and the minor axis of the electrode assembly 20 minus a distance from a point on the outer surface of the main body 110 in the same direction to the intersection of the major axis and the minor axis of the electrode assembly 20.

In some embodiments, L3 is a maximum distance L3 from a second surface of the first sealing edge 121 to the central axis of the electrode assembly 20, and $L3 \leq L1/2$. In this way, it is ensured that the radial maximum size of the battery 100 is L1, thereby improving the space efficiency of the battery.

It needs to be noted that the second surface of the first sealing edge 121 is a surface of the first sealing edge 121 on a side away from the main body 110.

In some embodiments, along the radial direction of the electrode assembly 20, the range of the width H2 of the gap region is: $0.2 \text{ mm} \leq H2 \leq 0.35 \text{ mm}$.

In some embodiments, in order to ensure that the radial maximum size of the battery cell 100 is L1, along a bending direction of the first sealing edge 121, the second end of the first sealing edge 121 does not exceed an end point of the major axis L1 on a side close to the first sealing edge 121.

In some embodiments, along the bending direction of the first sealing edge 121, L4 is a distance from the end point of the major axis on the side close to the first sealing edge to the second end of the first sealing edge, and $L4 > 0.5 \text{ mm}$.

The electrode assembly 20 is formed by stacking a first electrode plate, a separator, and a second electrode plate in sequence, and then winding them.

The tab 30 includes a first tab 31 and a second tab 32. The first tab is connected to the electrode assembly 20 and extends out of the packaging bag 10 from one of the second sealing edges 122. The second tab 32 is connected to the electrode assembly 20 and extends out of the packaging bag 10 from the other second sealing edge 122. Specifically, the first tab 31 is connected to the first electrode plate and extends out of the packaging bag 10 from one of the second sealing edges 122. The second tab 32 is connected to the second electrode plate and extends out of the packaging bag 10 from the other second sealing edge 122.

Understandably, the polarity of the first tab 31 is opposite to the polarity of the second tab 32.

The tab 30 may be disposed on the major axis or the minor axis of the electrode assembly 20, without being limited in this application.

In some embodiments, the battery cell 100 further includes a first sealant (not shown in the drawing) and a second sealant (not shown in the drawing). The first sealing edge 121 is located between the first sealant and the second sealant. The first sealant seals the joint between the first tab 31 and one of the second sealing edges 122. The second sealant seals the joint between the second tab 32 and the other second sealing edge 122.

In some embodiments, in order to prevent the first sealant and the second sealant from occupying the radial space of the battery cell, neither the first sealant nor the second sealant exceeds the first sealing edge 121.

Another embodiment of this application further provides a battery, including any one of the foregoing battery cells 100.

Another embodiment of this application further provides an electric device, including any one of the foregoing batteries and a load. The battery is configured to supply power to the load.

In some embodiments, the electric device may be an electric vehicle, a two-wheel electric vehicle, a sweeping robot, a watch, a mobile phone, a tablet, or the like.

By designing an elliptical shape of the radial cross section of the electrode assembly and limiting the dimensions of the major axis and the minor axis, in contrast to a conventional battery cell with a radial cross section that is circular, the battery cell, the battery, and the electric device according to the embodiments of this application can increase space efficiency of the battery cell and increase the energy density of the battery cell.

Finally, it needs to be noted that the foregoing embodiments are merely intended to describe the technical solutions of this application, but not to limit this application. Based on the concept of this application, the foregoing embodiments may be combined and the technical features in different embodiments may be combined, the steps may be implemented in any order, and many other variations may be made to different aspects of this application described above. For brevity, the variations are not provided herein in detail. Although this application is described in detail with reference to the foregoing embodiments, a person of ordinary skill in the art understands that modifications may still be made to the technical solutions described in the foregoing embodiments, or equivalent substitutions may still be made to some technical features in the technical solutions, without making the essence of the corresponding technical solutions depart from the scope of the technical solutions of the embodiments of this application.

What is claimed is:

1. A battery cell, comprising:
    an electrode assembly,
    wherein a shape of a radial cross section of the electrode assembly is an ellipse; and 0.3 mm≤L1−L2≤0.5 mm, L1 is a length of a major axis of the electrode assembly and L2 is a length of a minor axis of the electrode assembly;
    wherein the battery cell further comprises a packaging bag; and the packaging bag comprises a main body configured to accommodate the electrode assembly, and a sealing edge portion comprising a first sealing edge and two second sealing edges; wherein, along an axial direction of the electrode assembly, the first sealing edge is connected between the two second sealing edges;
    wherein a first end of the first sealing edge is connected to the main body, a second end of the first sealing edge is bent and fits snugly on an outer surface of the main body, a gap region is formed between a first surface of the first sealing edge and the outer surface of the main body; the first surface of the first sealing edge being a surface facing towards the main body; and
    wherein L2+H1+H2<L1, wherein along a radial direction of the electrode assembly, H1 is a thickness of the first sealing edge and H2 is a width of the gap region.

2. The battery cell according to claim 1, wherein, L3≤L1/2, L3 is a maximum distance from a second surface of the first sealing edge to a central axis of the electrode assembly; the second surface of the first sealing edge being a surface facing away from the main body.

3. The battery cell according to claim 1, wherein, 0.2 mm≤H2≤0.35 mm, H2 is a width of the gap region along a radial direction of the electrode assembly.

4. The battery cell according to claim 1, wherein,
    along a bending direction of the first sealing edge, the second end of the first sealing edge does not exceed an end point of the major axis on a side closer to the first sealing edge.

5. The battery cell according to claim 4, wherein, L4>0.5 mm, along the bending direction of the first sealing edge, L4 is a distance from the end point of the major axis on the side closer to the first sealing edge to the second end of the first sealing edge.

6. The battery cell according to claim 1, further comprising a first tab and a second tab, the first tab is connected to the electrode assembly and extends out of the packaging bag from one of the second sealing edges, and the second tab is connected to the electrode assembly and extends out of the packaging bag from the other second sealing edge.

7. The battery cell according to claim 1, wherein the first end of the first sealing edge is connected to an intersection point of the minor axis of the electrode assembly and the out surface of the main body.

8. A battery, comprising a battery cell, the battery cell comprising an electrode assembly, wherein a shape of a radial cross section of the electrode assembly is an ellipse; and 0.3 mm≤L1−L2≤0.5 mm, L1 is a length of a major axis of the electrode assembly and L2 is a length of a minor axis of the electrode assembly,
    wherein the battery further comprises a packaging bag; and the packaging bag comprises:
        a main body configured to accommodate the electrode assembly; and
        a sealing edge portion comprising a first sealing edge and two second sealing edges, wherein, along an axial direction of the electrode assembly, the first sealing edge is connected between the two second sealing edges;
    wherein a first end of the first sealing edge is connected to the main body, a second end of the first sealing edge is bent and fits snugly on an outer surface of the main body, a gap region is formed between a first surface of the first sealing edge and the outer surface of the main body; and
    wherein L2+H1+H2<L1, wherein along a radial direction of the electrode assembly, H1 is a thickness of the first sealing edge and H2 is a width of the gap region.

9. The battery according to claim 8, wherein, L3≤L1/2, L3 is a maximum distance from a second surface of the first sealing edge to a central axis of the electrode assembly.

10. The battery according to claim 8, wherein, 0.2 mm≤H2≤0.35 mm, H2 is a width of the gap region along a radial direction of the electrode assembly.

11. The battery according to claim 8, wherein,
    along a bending direction of the first sealing edge, the second end of the first sealing edge does not exceed an end point of the major axis on a side close to the first sealing edge.

12. The battery according to claim 11, wherein, L4>0.5 mm, along the bending direction of the first sealing edge, L4 is a distance from the end point of the major axis on the side close to the first sealing edge to the second end of the first sealing edge.

13. The battery according to claim 8, further comprising a first tab and a second tab, the first tab is connected to the electrode assembly and extends out of the packaging bag from one of the second sealing edges, and the second tab is connected to the electrode assembly and extends out of the packaging bag from the other second sealing edge.

14. The battery according to claim 8, wherein the first end of the first sealing edge is connected to an intersection point of the minor axis of the electrode assembly and the out surface of the main body.

15. An electric device, comprising a load and a battery configured to supply power to the load, the battery comprising a battery cell, the battery cell comprising an electrode assembly, wherein a shape of a radial cross section of the electrode assembly is an ellipse, and 0.3 mm≤L1−L2<0.5 mm, L1 is a length of a major axis of the electrode assembly and L2 is a length of a minor axis of the electrode assembly,
wherein the electric device further comprises a packaging bag, wherein the packaging bag comprises:
a main body configured to accommodate the electrode assembly; and
a sealing edge portion comprising a first sealing edge and two second sealing edges, wherein, along an axial direction of the electrode assembly, the first sealing edge is connected between the two second sealing edges;
wherein a first end of the first sealing edge is connected to the main body, a second end of the first sealing edge is bent and fits snugly on an outer surface of the main body, a gap region is formed between a first surface of the first sealing edge and the outer surface of the main body; and
wherein L2+H1+H2<L1, wherein along a radial direction of the electrode assembly, H1 is a thickness of the first sealing edge and H2 is a width of the gap region.

16. The electric device according to claim 15, wherein, L3≤L1/2, L3 is a maximum distance from a second surface of the first sealing edge to a central axis of the electrode assembly.

17. The electric device according to claim 15, wherein the first end of the first sealing edge is connected to an intersection point of the minor axis of the electrode assembly and the out surface of the main body.

\* \* \* \* \*